(12) United States Patent
Callis et al.

(10) Patent No.: US 8,066,504 B2
(45) Date of Patent: Nov. 29, 2011

(54) HELICOPTER BLADE MANDREL WITH ROLLER ASSEMBLY

(75) Inventors: Richard A. Callis, Covington, WA (US); Wayne Johnston, Auburn, WA (US); Nate Gray, Renton, CA (US); David P. Bailey, Woodinville, WA (US)

(73) Assignee: Hexcel Corporation, Dublin, CA (US)

( * ) Notice: Subject to any disclaimer, the term of this patent is extended or adjusted under 35 U.S.C. 154(b) by 979 days.

(21) Appl. No.: 12/011,344

(22) Filed: Jan. 25, 2008

(65) Prior Publication Data

US 2009/0189325 A1   Jul. 30, 2009

(51) Int. Cl.
*B29C 33/48* (2006.01)
(52) U.S. Cl. .......................... 425/403; 29/428; 29/897.2
(58) Field of Classification Search .................. 425/403
See application file for complete search history.

(56) References Cited

U.S. PATENT DOCUMENTS

| | | | | |
|---|---|---|---|---|
| 2,503,431 A | * | 4/1950 | Bender et al. ................. | 269/48.1 |
| 4,169,749 A | | 10/1979 | Clark | |
| 4,310,138 A | | 1/1982 | Johnston | |
| 4,327,052 A | * | 4/1982 | Sauer ............................ | 264/512 |
| 4,639,284 A | * | 1/1987 | Mouille et al. ................ | 156/213 |
| 4,892,462 A | | 1/1990 | Barbier et al. | |
| 5,087,187 A | * | 2/1992 | Simkulak et al. ............. | 425/112 |
| 5,346,367 A | | 9/1994 | Doolin et al. | |
| 5,755,558 A | | 5/1998 | Reinfelder et al. | |
| 5,939,007 A | * | 8/1999 | Iszczyszyn et al. ........... | 264/258 |
| 5,984,659 A | * | 11/1999 | Potter ............................ | 425/392 |
| 2005/0056362 A1 | * | 3/2005 | Benson et al. ................ | 156/163 |

FOREIGN PATENT DOCUMENTS

| | | |
|---|---|---|
| AU | 490628 B2 | 8/1976 |
| WO | WO 2008/147402 | 12/2008 |

* cited by examiner

*Primary Examiner* — Derris Banks
*Assistant Examiner* — Kaying Kue
(74) *Attorney, Agent, or Firm* — W. Mark Bielawski; David J. Oldenkamp

(57) ABSTRACT

Methods and apparatus are provided for making a rotor blade spar from composite material wherein a multi-component mandrel is used to form the composite spar. The mandrel is made using a number of components that are assembled and held in place using a roller assembly. The roller assembly is removed after pre-cure lay up and compaction of the composite material. Once the roller assembly is removed, the remaining mandrel components can be separated from each other and easily removed from the spar. The mandrel components, including the roller assembly, can then be re-assembled and re-used to form additional composite spars.

20 Claims, 5 Drawing Sheets

HELICOPTER BLADE MANDREL WITH ROLLER ASSEMBLY

BACKGROUND OF THE INVENTION

1. Field of the Invention

The present invention relates generally to helicopter rotor blades that are made from composite materials. More particularly, the present invention is directed to the processes and apparatus that are used in the manufacture of such composite rotor blades.

2. Description of Related Art

Rotor blades are a critical component of every helicopter. The rotor blades are subjected to a complex set of rather extreme aerodynamic forces that vary continually during flight. The rotor blades function as rotating airfoils or wings that are shaped to provide the aerodynamic lift required for a given aircraft. Rotor blades typically include a spar that extends from the root of the rotor blade to its tip. The spar is a major structural element of the rotor blade that provides the blade with the structural strength needed to carry high operational loads.

The typical rotor blade spar is a long tubular structure around which the rest of the blade is formed. The spar tube has an elliptical cross-section that is formed to provide a forward or leading edge and rearward or trailing edge. In order to provide optimum aerodynamic performance, many spar tubes include a slight twist about the longitudinal axis. Typical twists in the spar provide rotations of the elliptical cross-section of up to 10 degrees and more as one moves from the root of the rotor blade to its tip. In addition, the elliptical shape of the spar cross-section may be varied from the spar root to the spar tip to meet a variety of aerodynamic and structural loading parameters.

High strength materials, such as titanium and aluminum alloys, have typically been used to make rotor blades. These high strength metal materials are particularly well suited for forming the rotor blade spar. Titanium has been routinely formed into the relatively long, tubular spar structure and machined or otherwise fabricated to provide a complex variety of twists and varying cross-sectional shapes.

Composite materials have also been used to form rotor blade spars. The combination of light weight and structural strength have made composites a popular choice for making not only the rotor blade spar, but the entire rotor blade. Exemplary composite rotor blades and the processes for making them are described in U.S. Pat. Nos. 4,892,462; 5,346,367; 5,755,558; and 5,939,007.

The typical composite spar is fabricated by applying the uncured composite material to the surface of a long cylindrical mold or mandrel that is shaped to provide the interior surface of the spar tube. After the composite material is applied to the mold or mandrel, it is compacted and cured at an elevated temperature to provide the final spar structure. A problem associated with making composite spars revolves around what to do with the mold or mandrel once the spar has been formed. The length of the mold and the variations in elliptical cross-section of the spar, as well as any twist in the spar, make it very difficult to remove the mold or mandrel after the spar has cured.

One approach to solving the mold/mandrel removal problem has been to make a mold out of a material that is strong enough to maintain its shape during pre-cure fabrication of the composite spar, but which disintegrates or otherwise shrinks during the cure cycle so that it can be removed from the spar cavity or simply left in place. For example, a variety of foams have been used alone or in combination with an underlying hard mandrel structure to provide a suitable spar mold. The foam melts or otherwise shrinks to a fraction of its initial size during curing at elevated temperatures. The resulting shrunken mold is sufficiently small so that it can be removed from the spar cavity or left in place.

Although foam molds have been used successfully in fabricating composite spars for rotor blades, it is many times difficult to find a foam or other material that has the needed structural strength to maintain critical spar dimensions during formation of the spar, while at the same time being able to deteriorate relatively rapidly during cure. In addition, the mold can only be used once, which adds considerably to the cost of spar fabrication.

SUMMARY OF THE INVENTION

In accordance with the present invention, methods and apparatus are provided for making a rotor blade spar from composite material wherein a multi-component mandrel is used to form the composite spar. The mandrel is made using a number of components, which are assembled to provide a structure that is sufficiently strong to maintain the spar shape during pre-cure lay up, compaction and curing of the composite material. The multiple components used to form the mandrel can be separated from each other and easily removed from the spar either before or after curing of the composite material. The mandrel components can then be re-assembled and re-used to form additional composite spars.

As a feature of the present invention, a multi-component mandrel is provided for use in molding a helicopter blade wherein the rotor blade includes a spar that extends parallel to the longitudinal axis of the rotor blade. The spar that is being formed includes interior surfaces that form a spar cavity that also extends longitudinally from the root of the blade to the tip. The spar interior surfaces include a leading edge surface that is composed of an upper leading edge portion and a lower leading edge portion. The spar interior surfaces further include a trailing edge surface that is composed of an upper trailing edge portion and a lower trailing edge portion. The spar interior surfaces also include an upper surface that extends between the leading edge upper portion and the trailing edge upper portion, as well as a lower surface that extends between the leading edge lower portion and the trailing edge lower portion.

The mandrel is made up of a forward component that includes an exterior surface that is shaped to provide the leading edge surface of the spar interior surface. The forward component includes an upper rear edge that has an outer surface, which is shaped to provide the upper leading edge portion of the spar interior surfaces. The forward component also includes a lower rear edge that is shaped to provide the lower leading edge portion of the spar interior surfaces. The mandrel also includes a rearward component that is shaped to provide the trailing edge surface of the spar interior surfaces. The rearward component includes an upper forward edge that is shaped to provide the upper trailing edge portion of the spar interior surfaces. The rearward component also includes a lower forward edge that is shaped to provide the lower trailing edge portion or the spar interior surfaces.

The forward and rearward components of the mandrel are connected together by an upper component and a lower component. The upper component is shaped to provide the upper surface of said spar interior surfaces. The upper component includes a forward edge that is connected to the upper rear edge of the forward component and a rearward edge that is connected to the upper forward edge of the rearward component. The lower component is shaped to provide the lower surface of said spar interior surfaces. The lower component includes a forward edge that is connected to the lower rear edge of the forward component and a rearward edge that is connected to the lower forward edge of said rearward component.

The final component of the mandrel is a roller assembly that functions as a support structure that is located between the upper component and the lower component. The roller assembly provides reinforcement for the upper and lower components and also holds them in place against the forward and rearward components. As a feature of the present invention, the roller assembly may be removed by pulling it longitudinally from the mandrel. Once the roller assembly is removed, the upper and lower components of the mandrel can be disconnected from the forward and rearward components. The components can then be removed individually from the spar cavity.

The present invention also covers methods for making the multi-component mandrels that include the roller assembly support structure, as well as the methods for molding composite rotor blade spars using the multi-component mandrel and the resulting rotor blade spar. The multi-component mandrel of the present invention provides a number of advantages over existing methods for making composite rotor blades. These advantages include the ability to withstand the forces applied to the mandrel during fabrication of the composite blade in order to avoid any undesirable variations in blade shape. In addition, the mandrel can be used to form relatively large and complex spar shapes including spars with varying degrees of twist and changes in elliptical cross-sectional geometry. A further advantage is that the mandrel can be re-assembled and used repeatedly.

The above described and many other features and attendant advantages of the present invention will become better understood by reference to the following detailed description when taken in conjunction with the accompanying drawings.

DETAILED DESCRIPTION OF THE INVENTION

Figure 1:
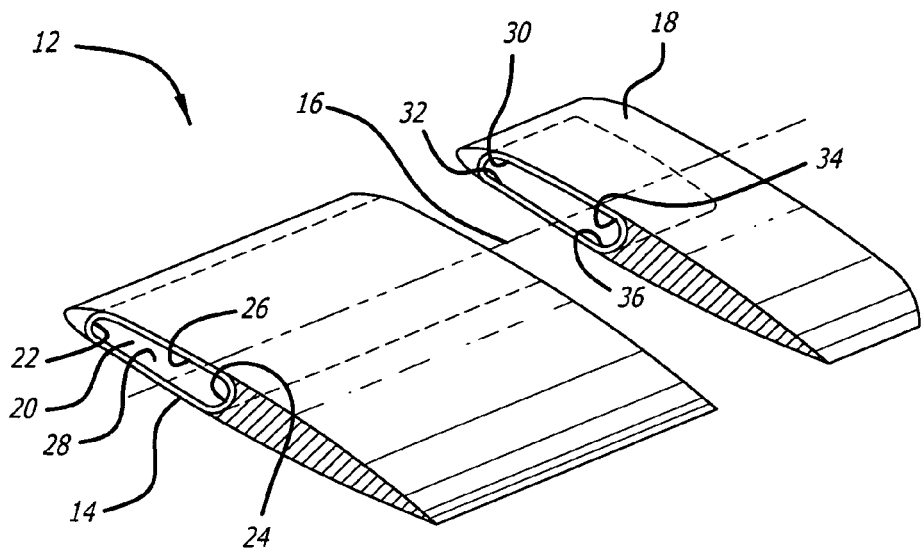
FIG. 1 is a partial perspective view of an exemplary composite helicopter rotor blade that includes a spar that can be made using the multi-component mandrel in accordance with the present invention.
Figure 2:
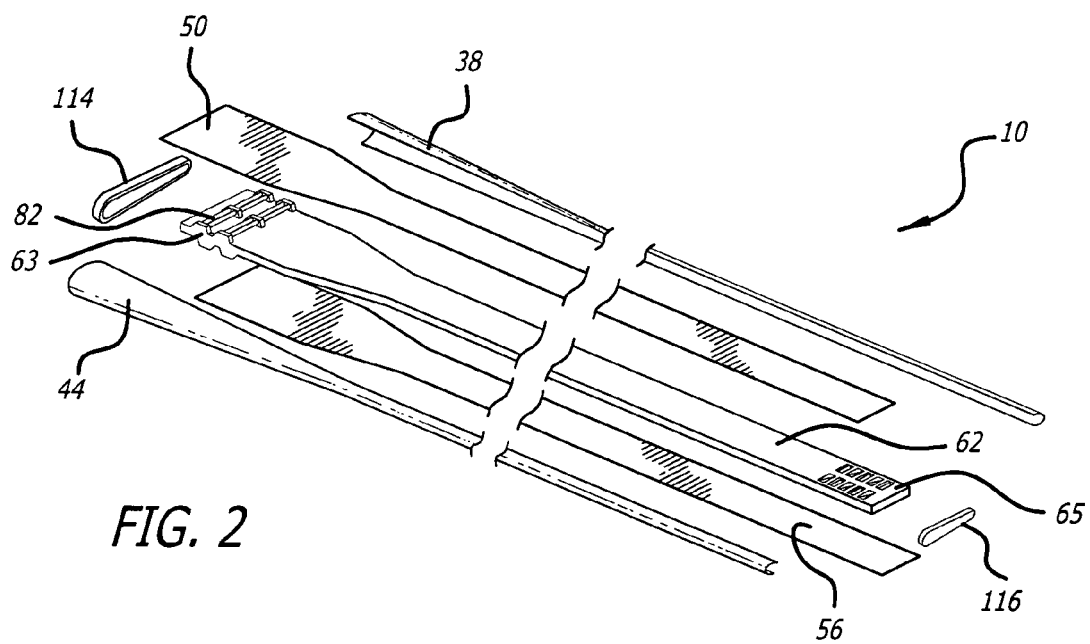
FIG. 2 is a perspective exploded view of a preferred exemplary multi-component mandrel in accordance with the present invention.

The individual components of a preferred exemplary multi-component mandrel in accordance with the present invention for use in molding a helicopter rotor blade from composite material are shown generally at 10 in FIG. 2. An exemplary helicopter rotor blade that can be molded utilizing the mandrel components 10 is shown in a simplified form in FIG. 1 at 12. The rotor blade 12 includes a spar 14 that extends parallel to the longitudinal axis 16 of the rotor blade 12. The spar 14 typically extends from the root of the rotor blade (not shown) to the tip 18. The spar 14 is a tubular structure that has an elliptically shaped cross-section as shown in FIG. 1. The spar 14 includes a number of interior surfaces that are formed by the mandrel components 10. These interior spar surfaces define the spar cavity 20.

Referring to FIG. 1, the spar interior surfaces are composed of a leading edge surface 22, trailing edge surface 24, an upper surface 26 and a lower surface 28. The leading edge surface 22 includes an upper leading edge portion 30 and a lower leading edge portion 32. The trailing edge surface 24 includes an upper trailing edge portion 34 and lower trailing edge portion 36. The upper surface 26 extends between the upper leading edge portion 30 and the upper trailing edge portion 34. The lower surface 28 extends between the lower leading edge portion 32 and the lower trailing edge portion 36.

Figure 10:
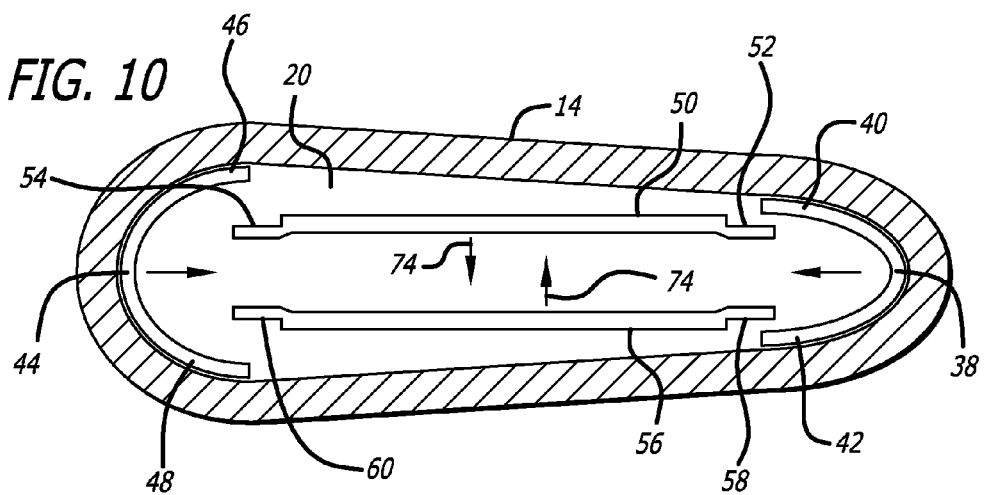
FIG. 10 is a side view showing disassembly of the mandrel after the composite spar has been formed and the roller assembly removed.

Referring to FIGS. 2 and 10, the mandrel 10 includes a forward component 38 that has an exterior surface, which is shaped to provide the spar interior leading edge surface 22. The mandrel forward component 38 includes an upper rear edge 40 that has an exterior surface, which is shaped to provide the upper leading edge portion 30 of the spar. The mandrel forward component 38 also includes a lower rear edge 42 that has an exterior surface, which is shaped to provide the lower leading edge portion 32 of the spar.

The mandrel 10 also includes a rearward component 44 that has an exterior surface, which is shaped to provide the spar interior trailing edge 24. The mandrel rearward component 44 includes an upper forward edge 46 that has an exterior surface, which is shaped to provide the upper trailing edge portion 34. The mandrel rearward component 44 also includes a lower forward edge 48 that has an exterior surface, which is shaped to provide the lower trailing edge portion 36.

The mandrel 10 further includes an upper component 50 that has an exterior surface, which is shaped to provide the spar upper interior surface 26. The upper component 50 includes a forward edge 52 that is connected to the upper rear edge 40 of the forward component 38. The upper component 50 also includes a rearward edge 54 that is connected to the upper forward edge 46 of the rearward component 44. The mandrel 10 also includes a lower component 56 that has an exterior surface, which is shaped to provide the spar lower interior surface 28. The lower component 56 includes a forward edge 58 that is connected to the lower rear edge 42 of the forward component 38. The lower component 56 also includes a rearward edge 60 that is connected to the lower forward edge 48 of the rearward component 44.

The final component of mandrel 10 is a roller assembly support structure, which is shown in FIG. 2 at 62. The roller assembly 62 extends longitudinally within the mandrel 10 (i.e. parallel to the longitudinal axis 16 of the spar). The roller assembly 62 is located within the mandrel cavity so as to provide support for the upper component 50 and lower component 56 along their entire lengths. It should be noted that rollers are only shown only at the root 63 and tip 65 of the mandrel for demonstrative purposes. In accordance with the present invention, it is required that the rollers be present along substantially the entire length of the roller assembly 62 in order to allow removal of the roller assembly from the mandrel. "Substantially" means that the rollers are present along at least 80 percent (preferably 90 percent) of the length of the mandrel. It is preferred that the rollers be spaced at uniform intervals continuously along the entire length of the roller assembly to provide uniform support for the upper and lower mandrel components and to prevent frictional contact between the assembly and the mandrel. However, the rollers may be arranged in non-continuous and non-uniform configurations provided that there are sufficient rollers located along a sufficient length of the mandrel to adequately support the upper and lower mandrel components and to allow the roller assembly to be removed from the mandrel without undue force or damage to the mandrel components.

As can be seen from FIG. 10, the forward and rearward edges 52 and 54 of the upper component 50 are shaped so that they overlap on the inside of the upper rear edge 40 of the forward component 38 and upper forward edge 46 of the rearward component 44, respectively. This overlapping arrangement provides for a secure, but releasable, connection between the upper component 50 and the forward and rearward components 38 and 44. Likewise, the forward and rearward edges 58 and 60 of the lower component 56 are shaped so that they overlap on the inside of the lower rear edge 42 of the forward component 38 and lower forward edge 48 of the rearward component 44, respectively. This overlapping arrangement also provides for a secure, but releasable, connection between the lower component 56 and the forward and rearward components 38 and 44.

The roller assembly 62 provides a support structure that holds the upper and lower mandrel components 50 and 56 in place and provides compression connections along the four locations where the mandrel components overlap as described above. These compression connections keep the mandrel in the form of a single relatively strong structure during fabrication of the composite spar. Upon removal of the roller assembly 62, the upper and lower components 50 and 56 may be moved toward each other and disconnected from the forward and rearward components 38 and 44 as shown in FIG. 10.

Figure 3:
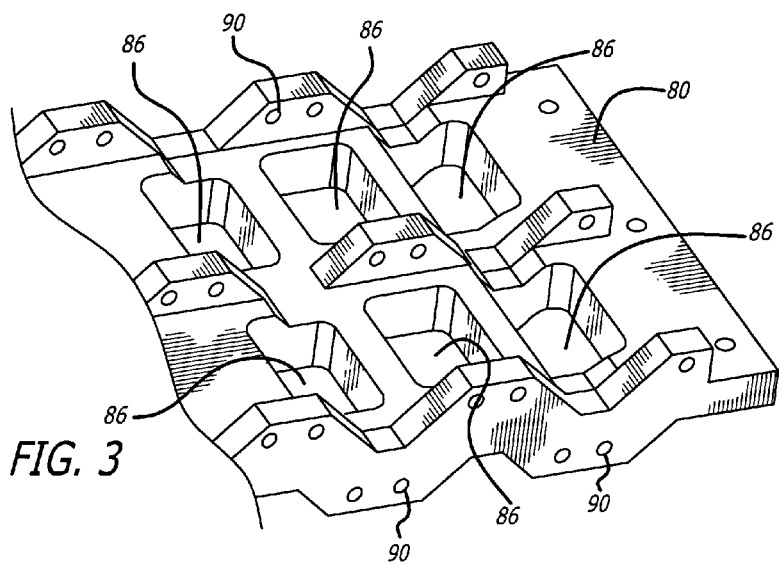
FIG. 3 is a bottom perspective view of the rib cage of the portion of an exemplary roller assembly located at the root of the spar cavity.
Figure 4:
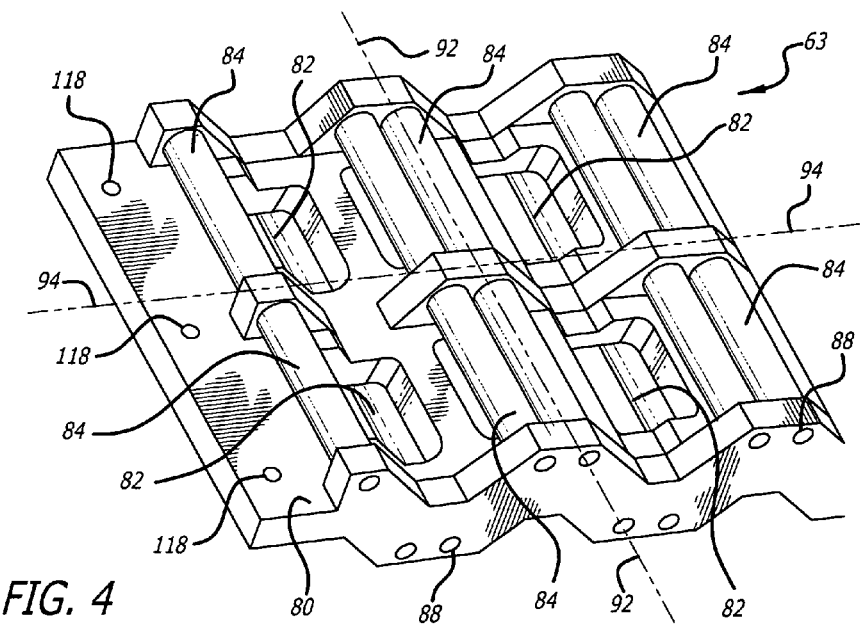
FIG. 4 is a bottom perspective view of the same portion of the roller assembly located at the root of the spar cavity as shown in FIG. 3, except that the rollers are shown mounted to the rib cage to show the complete roller assembly and the view has been rotated 180 degrees.
Figure 5:
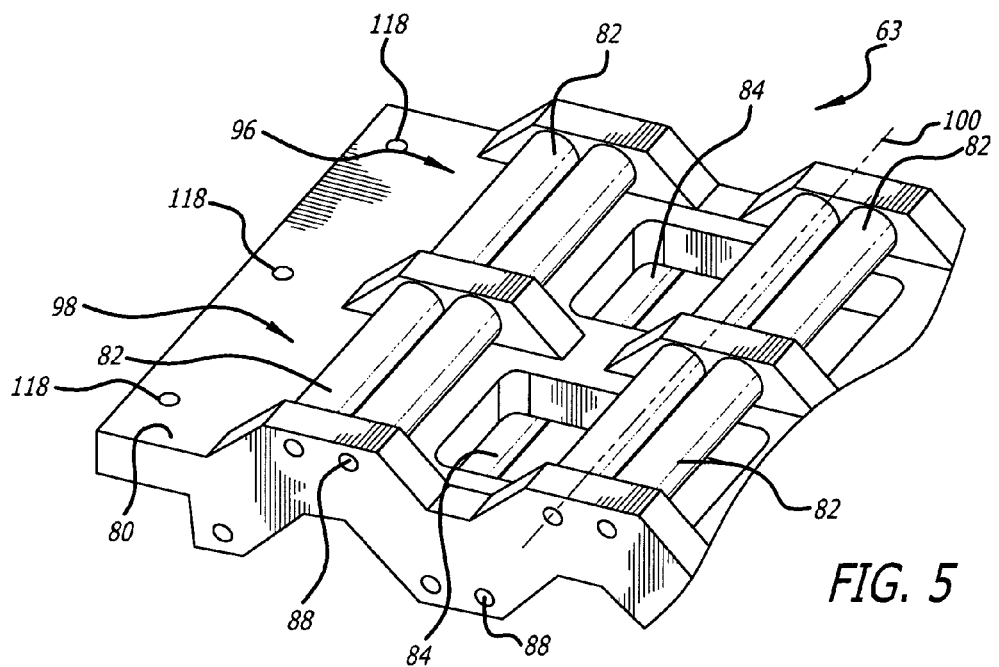
FIG. 5 is a top perspective view of the same exemplary root portion of the roller assembly shown in FIG. 4.

The root section 63 of the roller assembly 62 is shown in FIGS. 4 and 5. The root section 63 includes a rib cage structure 80 to which a plurality of upper rollers 82 and lower rollers 84 are attached. The rib cage structure 80 is shown without the rollers in FIG. 3 to provide a better view of the openings 86 in the structure. The opening may be any shape and any size desired provided that the rib cage is sufficiently strong to support the rollers in position during mold compaction and/or curing. The openings 86 are not essential and it is possible to provide a solid roller support structure or one that has a limited number of openings. However, it is preferred to use the largest size and maximum number openings 86 to form a rib cage structure that is as light as possible, while still providing the necessary structural support for the rollers.

The rib cage structure 80 may be made from any strong and preferably lightweight material that can be machined in to form roller support structures of the type shown in FIG. 3. Although any number of metals are suitable, it is preferred that the rib cage structure 80 be made from a quasi-isotropic chopped prepreg composite material, such as HexMC® which is available from Hexcel Corporation (Dublin, Calif.). HexMC® is a moldable and machinable carbon fiber/epoxy composite material that is particularly well suited for making strong, lightweight and relatively complex rib cage structures. HexMC® and related quasi-isotropic chopped prepreg composite materials are described in published United States patent application US2007-0012858 A1 and PCT published application WO2007/008953.

The upper rollers 82 and lower rollers 84 may be mounted to the rib cage 80 using any conventional mounting method provided that the rollers are able to rotate freely. It is preferred that mounting pins or axles 88 be provided at the ends of each roller. The mounting pins 88 may be press fit or machined into the ends of each roller. Corresponding low-friction bushings or roller bearings are located in the rib cage 80 to provide for mounting of the pins 88. When using a carbon fiber composite material, such as HexMC® for the rib cage 80, it is only necessary that mounting holes 90 be provided (See FIG. 3). Separate bushings or bearings for mounting the roller pins 88 are not required because HexMC®-type materials are self-lubricating. The rollers 82 and 84 may be made from any metal that is typically used for roller bearings and the like. Other suitable roller materials include nylon, fiberglass and polypropylene.

Figure 9:
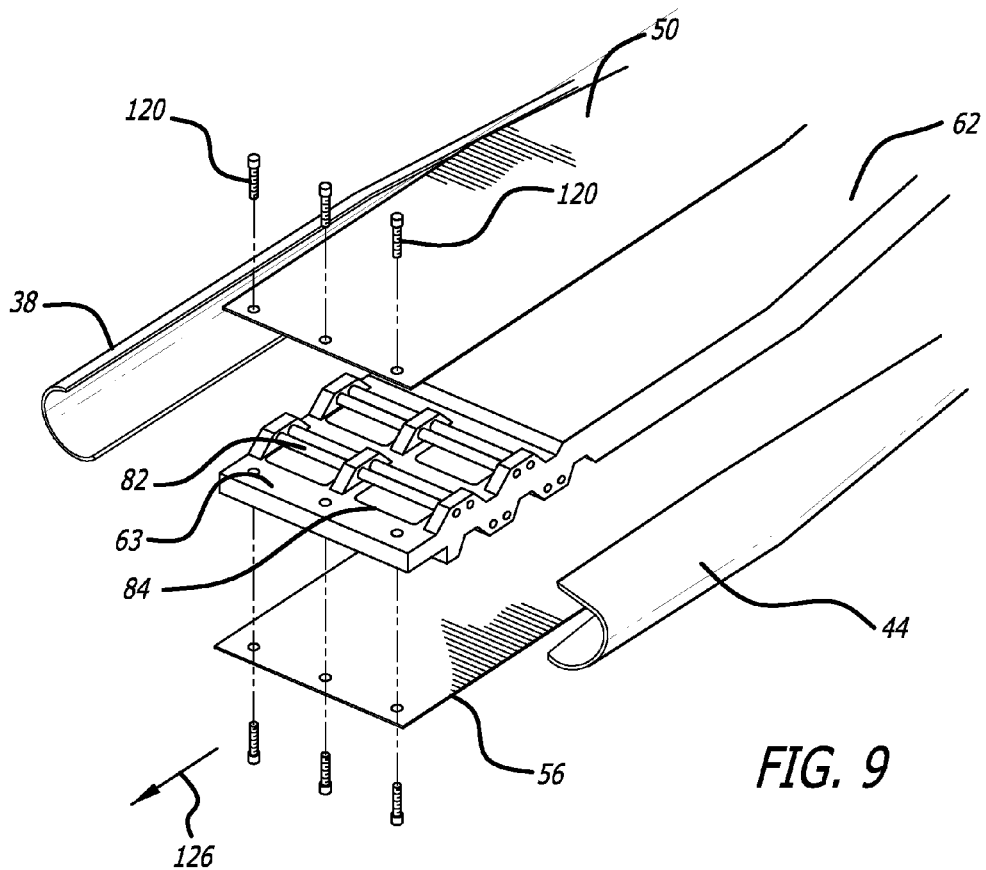
FIG. 9 is a top perspective exploded view showing the components of an exemplary mandrel at the root of the spar cavity.

As shown in FIG. 9, the roller assembly 62 is located between the upper component 50 and lower component 56 so that the upper rollers 82 contact and support the upper component 50 and the lower rollers 84 contact and support the lower component 56 of the assembled mandrel. The rotational axis 92 of the rollers is preferably substantially perpendicular to the longitudinal axis 94 of the rotor blade and spar cavity (see FIG. 4). The term "substantially perpendicular" means that angle between the rotational axis 92 of the rollers and the longitudinal axis 94 of the rotor blade is between 75 and 105 degrees and preferably between 85 and 95 degrees.

As shown in FIG. 5, the upper rollers 82 located in the root section 63 are divided into pairs of forward upper rollers 96 and pairs of rearward upper rollers 98. It is preferred that the rotational axis of the forward upper rollers 96 and the rotational axis of the rearward upper rollers be substantially co-planar as shown at 100 to provide a plurality of co-planar upper rollers. This configuration of upper rollers is preferred when the upper mandrel component is relatively flat and must be supported in a substantially co-planar manner. The term "substantially co-planar" means that the rotational axis of the rollers lies within an angle of plus or minus 10 degrees of the same plane and preferably within an angle of plus or minus 5 degrees of the same plane. It is also preferred in the root section 63 that the forward lower rollers and rearward lower rollers have rotational axis that are substantially co-planar. Further, it is preferred that the rotational axis of the co-planar upper rollers be substantially parallel to the rotational axis of the co-planar lower rollers as shown in FIGS. 4 and 5. The term "substantially parallel" means that the rotational axis of the upper and lower rollers diverge or converge upon each other by an angle of less than 10 degrees and preferably less than 5 degrees.

Figure 6:
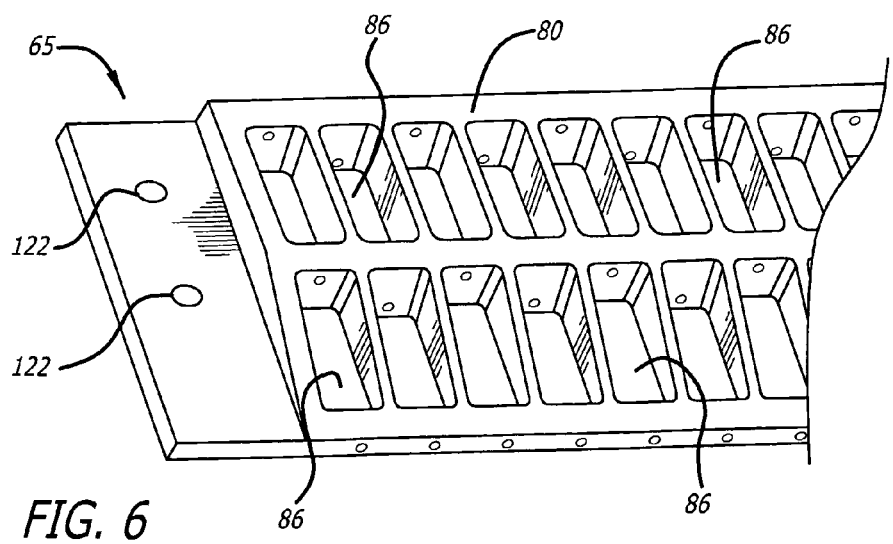
FIG. 6 is a top perspective view of the rib cage of the portion of an exemplary roller assembly located at the tip of the spar cavity.
Figure 7:
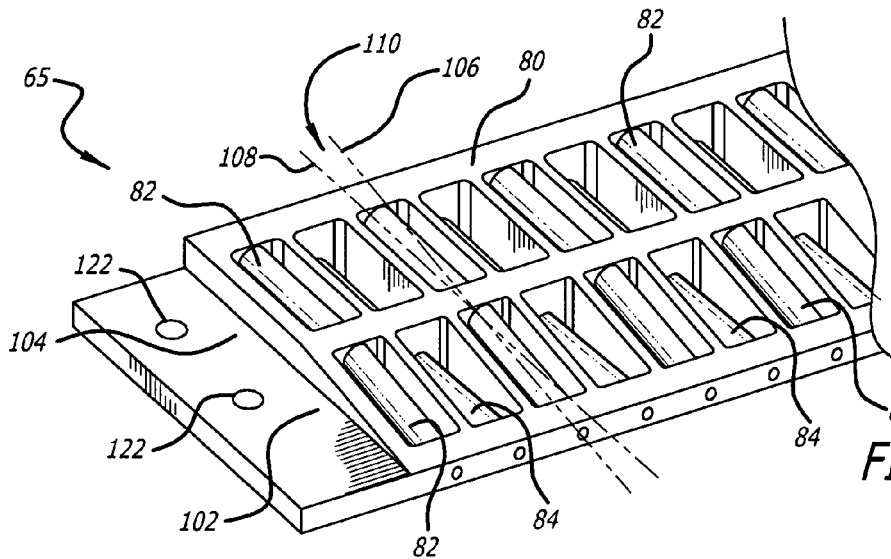
FIG. 7 is top perspective view of the same portion of the roller assembly located at the tip of the spar cavity as shown in FIG. 8, except that the rollers are shown mounted to the rib cage to show the complete roller assembly.
Figure 8:
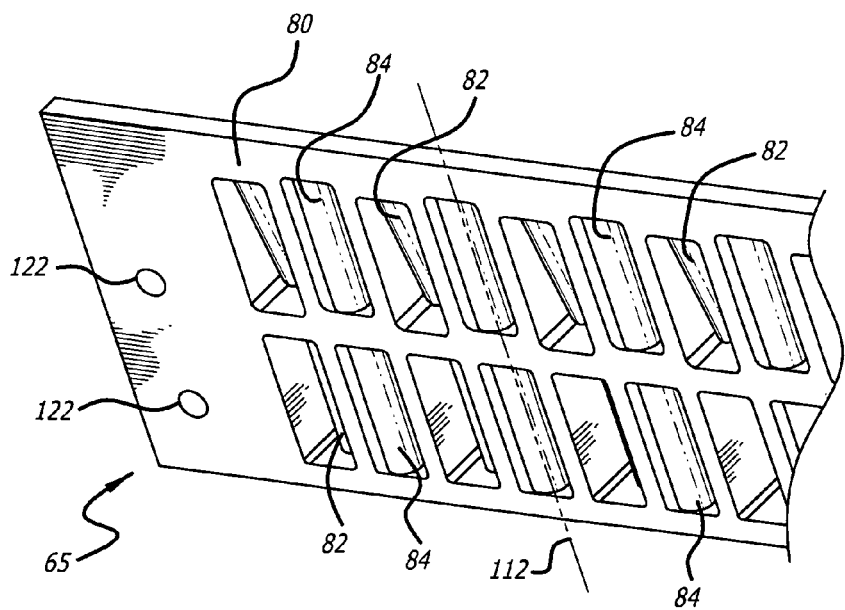
FIG. 8 is bottom perspective view of the same exemplary tip portion of the roller assembly shown in FIG. 7.

The tip section 65 of the roller assembly 62 is shown in FIGS. 7 and 8. The tip section 65 includes the outer end of rib cage structure 80 to which a plurality of upper rollers 82 and lower rollers 84 are attached. The tip section of rib cage structure 80 is shown without the rollers in FIG. 6 to provide a better view of the openings 86 in the structure. The openings 86 are not essential. However, as previously mentioned, they are preferred in order to reduce the weight of the roller assembly 62 as much as possible. The rollers in the tip section 65 of the exemplary roller assembly 62 are mounted to the rib cage structure 80 in the same manner as the root section 63, except that the rollers are not mounted in pairs and the orientation of their rotational axis is varied to accommodate the decrease in size and the change in shape of the spar cavity.

As shown in FIG. 7, the upper rollers 82 that are located in the tip section 65 are divided into individual forward upper rollers 102 and individual rearward upper rollers 104. It is preferred that the rotational axis of the forward upper rollers 102 and the rotational axis of the rearward upper rollers not be co-planar as shown at 106 and 108 to provide a plurality of non-planar upper rollers. This configuration of upper rollers is preferred when the upper mandrel component is curved and must be supported in a substantially non-planar manner. The term "non-planar" means that the rotational axes of the rollers are at least 10 degrees apart as shown at 110. To accommodate typical spar cavity cross-sectional geometry at the spar tip, it is preferred that the tip section 65 of the roller assembly 62 include forward lower rollers and rearward lower rollers that have rotational axes that are substantially co-planar as shown at 112 in FIG. 8.

The configuration of the rollers in the sections of the roller assembly located between the root 63 and tip 65 should be gradually changed between the two types of exemplary roller configuration shown herein in order to accommodate the gradual change in cross-sectional shape of the mandrel as it progresses from the root to the tip of the spar cavity.

FIGS. 2 and 9 show the mandrel as it is being assembled prior to application of the composite material for the spar. The various components, including the central roller assembly are preferably bound together using a suitable tape or shrink-wrap film. Films that are compression-force heat-shrinkable tape are preferred. It is preferred, but not necessary, that the film or tape be wrapped around the entire surface area of the mandrel. Root end cap 114 and tip end cap 116 are also preferably provided to lock the other mandrel components in place. The root end cap 114 is attached to holes 118 located at the root end of the rib cage using releasable fasteners 120. In the same manner, the tip end cap 116 is attached to holes 122 located at the tip end of the rib cage using releasable fasteners (not shown).

FIG. 10 shows a partial cross-sectional view of the mandrel components located within the composite spar 14 just after compaction and/or curing of the composite material and removal of the roller assembly 62. As shown in FIG. 9, the roller assembly 62 is removed by pulling it longitudinally out of the mandrel as represented by arrow 126. Once the roller assembly has been removed, the upper and lower components 50 and 56 are moved inward towards each other, as represented by arrows 74, so that they can be removed from the spar cavity 20 in the direction of arrow 126. The forward and rearward components 38 and 44 are also moved inward towards each other, as represented by arrows 76, so that they also can be removed from the spar cavity 20 in the same direction as the other components.

The mandrel 10 may be removed from the spar cavity 20, as described above, either after compaction of the uncured spar composite material around the mandrel or after the compacted composite spar has been cured. It is preferred to remove the mandrel prior to curing in order to maximize the number of times it can be re-used and to allow vacuum bagging to be inserted and replaced, if necessary. The mandrel should be able to withstand the pressures that are present during normal procedures for molding helicopter rotor blade spars. Typically, the mandrel should be able to withstand external pressures on the order of 10 to 15 inches of Hg and higher. The mandrel should also be able to withstand the temperatures at which the composite materials used to make the spar are cured. Typically, such composites are cured at temperatures in the range of 120° C. to 200° C. and even higher.

The materials that are used to make the four external components of the mandrel 10 may also be any of the metals typically used for making mandrels for molding composite materials. However, as was the case with the roller assembly, composite materials are preferred for making the external mandrel components that actually come in contact with the spar during rotor blade fabrication. The external surfaces of the mandrel or the shrink-wrap (if used) may be coated with a suitable release agent, if desired.

The composite materials that may be used to make the exterior mandrel components include those containing glass or carbon fibers. The fibers may be in the form of woven fabric, unidirectional fibers or randomly oriented fibers. Any of the various thermosetting resins that are suitable for use in relatively high temperature molding operations may be used as the matrix material. Exemplary resins include epoxies, phenolics, bismaleimides and polyester. The preferred mandrel material is the same quasi-isotropic composite material composed of randomly oriented chips of unidirectional fibers in an epoxy matrix that is preferred for making the rib cage structure. As previously mentioned, this type of mandrel material is available from Hexcel Corporation (Dublin, Calif.) under the tradename HexMC®. An alternate preferred material for use in making the mandrel components is carbon fabric/epoxy prepreg, such as HEXCEL 8552, which is also available from Hexcel Corporation (Dublin, Calif.). Both of these materials are supplied as uncured prepregs, which can be formed into the desired mandrel component and cured according to conventional methods for fabricating and curing epoxy-based composite structures.

As an example, the mandrel of the present invention may be used to mold the spar of a helicopter rotor blade where the spar is on the order of 20 to 35 feet long or even longer for large helicopters. The distance between the leading edge and trailing edge of the spar at the blade root ranges from a few inches to two feet or more. This distance tapers down to a few inches to a foot or more at the blade tip. The thickness of the spar at the blade root ranges from an inch to a foot or more and tapers down to less than an inch or up to a few inches at the blade tip. The spar has a twist on the order 10 degrees about its longitudinal axis from the root of the spar to its tip. The various external components of the mandrel (forward component, rearward component, upper component and lower component) are made to match the internal shape of the spar. They are fabricated as four individual components that are each 20 to 35 feet long. Each component is made from a sufficient number of plies of Hexcel 8552 carbon/epoxy prepreg or HexMC® to make components that are from 0.01 inch thick to 0.5 inch thick or more depending upon the size of the mandrel. The components are cured according to conventional curing procedures.

The exemplary mandrel described herein is suitable for forming the spar in a helicopter rotor blade that is around 33 feet long. The spar cavity at the root end is about 2 feet wide and has a maximum thickness of about 7 inches. The spar cavity at the tip end is about 3 feet wide and has a maximum thickness of about 0.9 inch. The rollers at the root end of the roller assembly are approximately 1 inch in diameter and 14 inches long. The rollers at the tip end of the roller assembly are approximately ½ inch in diameter and 6 inches long.

The roller assembly is positioned inside the mandrel cavity so that the upper and lower rollers apply the proper supporting force against the upper and lower components of the mandrel over the entire length of the mandrel. The longitudinal distance between the individual rollers is chosen to provide the needed support for the upper and lower components. The longitudinal distances between the rollers may vary form the root to the tip. For example, it is preferred to configure the upper and lower rollers as pairs nearer the root of the mandrel in order to provide added support where the spar cavity has the largest cross-sectional area. Pairing of the upper rollers together and pairing of the lower rollers together, as shown in FIGS. 4 and 5, provides adequate support at the root end of the mandrel while at the same time allowing the space between the pairs of upper rollers and pairs of lower rollers to be maximized, which in turn helps to reduce the weight of the overall mandrel. At the tip of the mandrel, where the cross-sectional area that needs to be supported is at a minimum, it is preferred that the upper rollers and lower rollers not be paired. Instead, the rollers alternate longitudinally between individual upper and lower rollers.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. A mandrel for use in molding a helicopter rotor blade wherein said rotor blade includes a spar that extends parallel to the longitudinal axis of said rotor blade, said longitudinal axis extending from the root of said rotor blade to the tip of said rotor blade, said spar having interior surfaces that defines a spar cavity that also extends longitudinally from the root of said rotor blade to the tip of said rotor blade, said spar interior surfaces including a leading edge surface that comprises an upper leading edge portion and a lower leading edge portion, a trailing edge surface that comprises an upper trailing edge portion and a lower trailing edge portion, an upper surface that extends between said leading edge upper portion and said trailing edge upper portion and a lower surface that extends between said leading edge lower portion and said trailing edge lower portion, said mandrel comprising:

a forward component that comprises an exterior surface that is shaped to provide said leading edge surface of said spar interior surfaces, said forward component comprising an upper rear edge comprising an outer surface that is shaped to provide said upper leading edge portion and a lower rear edge that is shaped to provide said lower leading edge portion;

a rearward component that is shaped to provide said trailing edge surface of said spar interior surfaces, said rearward component comprising an upper forward edge that is shaped to provide said upper trailing edge portion and a lower forward edge that is shaped to provide said lower trailing edge portion;

an upper component that is shaped to provide said upper surface of said spar interior surfaces, said upper component comprising a forward edge that is connected to said upper rear edge of said forward component and a rearward edge that is connected to said upper forward edge of said rearward component, said upper component extending from the root of said spar cavity to the tip of said spar cavity;

a lower component that is shaped to provide said lower surface of said spar interior surfaces, said lower component comprising a forward edge that is connected to said lower rear edge of said forward component and a rearward edge that is connected to said lower forward edge of said rearward component, said lower component extending from the root of said spar cavity to the tip of said spar cavity; and a roller assembly located between said upper component and said lower component, said roller assembly comprising a plurality of upper rollers that contact said upper component and a plurality of lower rollers that contact said lower component, wherein each of said upper rollers rotates about a rotational axis and each of said lower rollers rotates about a rotational axis, wherein said upper rollers comprise a plurality of forward upper rollers and a plurality of rearward upper rollers.

2. A mandrel for use in molding a helicopter rotor blade according to claim 1 wherein said roller assembly comprises a rib cage structure to which said upper rollers and said lower rollers are attached.

3. A mandrel for use in molding a helicopter rotor blade according to claim 1 wherein said rotational axis of said upper rollers and said rotational axis of said lower rollers is substantially perpendicular to said longitudinal axis of said rotor blade.

4. A mandrel for use in molding a helicopter rotor blade according to claim 2 wherein said rib cage structure comprises a composite material.

5. A mandrel for use in molding a helicopter rotor blade according to claim 1 wherein the rotational axis of at least one of said forward upper rollers is substantially co-planar with the rotational axis of at least one of said rearward upper rollers.

6. A mandrel for use in molding a helicopter rotor blade according to claim 5 wherein said co-planar upper rollers are located at the root of said spar cavity.

7. A mandrel for use in molding a helicopter rotor blade according to claim 1 wherein the rotational axis of at least one of said forward upper rollers is not co-planar with the rotational axis of at least one of said rearward upper rollers.

8. A mandrel for use in molding a helicopter rotor blade according to claim 7 wherein said non-planar upper rollers are located at the tip of said spar cavity.

9. A mandrel for use in molding a helicopter rotor blade according to claim 1 wherein the connections between said rearward component and said upper and/or lower components are releasable connections.

10. A mandrel for use in molding a helicopter rotor blade according to claim 1 wherein said upper rollers and said lower rollers comprise cylinders having a diameter and a length wherein the length of said cylinders are greater than the diameter of said cylinders.

11. A mandrel for use in molding a helicopter rotor blade wherein said rotor blade includes a spar that extends parallel to the longitudinal axis of said rotor blade, said longitudinal axis extending from the root of said rotor blade to the tip of said rotor blade, said spar having interior surfaces that defines a spar cavity that also extends longitudinally from the root of said rotor blade to the tip of said rotor blade, said spar interior surfaces including a leading edge surface that comprises an upper leading edge portion and a lower leading edge portion, a trailing edge surface that comprises an upper trailing edge portion and a lower trailing edge portion, an upper surface that extends between said leading edge upper portion and said trailing edge upper portion and a lower surface that extends between said leading edge lower portion and said trailing edge lower portion, said mandrel comprising:

a forward component that comprises an exterior surface that is shaped to provide said leading edge surface of said spar interior surfaces, said forward component comprising an upper rear edge comprising an outer surface that is shaped to provide said upper leading edge portion and a lower rear edge that is shaped to provide said lower leading edge portion;

a rearward component that is shaped to provide said trailing edge surface of said spar interior surfaces, said rearward component comprising an upper forward edge that is shaped to provide said upper trailing edge portion and a lower forward edge that is shaped to provide said lower trailing edge portion;

an upper component that is shaped to provide said upper surface of said spar interior surfaces, said upper component comprising a forward edge that is connected to said upper rear edge of said forward component and a rearward edge that is connected to said upper forward edge of said rearward component, said upper component extending from the root of said spar cavity to the tip of said spar cavity;

a lower component that is shaped to provide said lower surface of said spar interior surfaces, said lower component comprising a forward edge that is connected to said lower rear edge of said forward component and a rearward edge that is connected to said lower forward edge of said rearward component, said lower component extending from the root of said spar cavity to the tip of said spar cavity; and a roller assembly located between said upper component and said lower component, said roller assembly comprising a plurality of upper rollers that contact said upper component and a plurality of lower rollers that contact said lower component, wherein each of said upper rollers rotates about a rotational axis and each of said lower rollers rotates about a rotational axis, wherein said lower rollers comprise a plurality of forward lower rollers and a plurality of rearward lower rollers.

12. A mandrel for use in molding a helicopter rotor blade according to claim 11 wherein the rotational axis of at least one of said forward lower rollers is co-planar with the rotational axis of at least one of said rearward lower rollers.

13. A mandrel for use in molding a helicopter rotor blade according to claim 11 wherein the rotational axis of at least one of said forward lower rollers is not co-planar with the rotational axis of at least one of said rearward lower rollers.

14. A mandrel for use in molding a helicopter rotor blade according to claim 11 wherein the wherein said upper rollers comprise a plurality of forward upper rollers and a plurality of rearward upper rollers.

15. A mandrel for use in molding a helicopter rotor blade according to claim 14 wherein the rotational axis of at least one of said forward upper rollers is substantially co-planar with the rotational axis of at least one of said rearward upper roller.

16. A mandrel for use in molding a helicopter rotor blade according to claim 15 wherein the rotational axis of at least one of said co-planar upper rollers is substantially parallel to the rotational axis of at least one of said forward lower rollers or at least one of said rearward lower rollers.

17. A mandrel for use in molding a helicopter rotor blade according to claim 14 wherein the rotational axis of at least one of said forward upper rollers is not co-planar with the rotational axis of at least one of said rearward upper rollers and wherein the rotational axis of at least one of said forward lower rollers is not co-planar with the rotational axis of at least one of said rearward lower rollers.

18. A mandrel for use in molding a helicopter rotor blade according to claim 17 wherein the rotational axis of said rearward upper rollers and the rotational axis of said rearward lower rollers converge towards each other.

19. A mandrel for use in molding a helicopter rotor blade according to claim 17 wherein said non-planar upper rollers and said non-planar lower rollers are located at the tip of said spar cavity.

20. A mandrel for use in molding a helicopter rotor blade according to claim 17 wherein the rotational axis of said forward upper rollers and the rotational axis of said forward lower rollers converge towards each other.

* * * * *